(12) United States Patent
Oguntuase

(10) Patent No.: US 11,332,374 B2
(45) Date of Patent: May 17, 2022

(54) GRAPHENE MEMBRANE AND METHOD FOR MAKING GRAPHENE MEMBRANE

(71) Applicant: 2599218 ONTARIO INC., Toronto (CA)

(72) Inventor: Nifemi Oguntuase, Dartmouth (CA)

(73) Assignee: 2599218 ONTARIO INC., Toronto (CA)

( * ) Notice: Subject to any disclaimer, the term of this patent is extended or adjusted under 35 U.S.C. 154(b) by 105 days.

(21) Appl. No.: 16/810,918

(22) Filed: Mar. 6, 2020

(65) Prior Publication Data
US 2021/0276872 A1 Sep. 9, 2021

(51) Int. Cl.
*C01B 32/184* (2017.01)
*B01D 69/02* (2006.01)
*B01D 71/02* (2006.01)

(52) U.S. Cl.
CPC ............ *C01B 32/184* (2017.08); *B01D 69/02* (2013.01); *B01D 71/021* (2013.01)

(58) Field of Classification Search
CPC ..... C01B 32/182; C01B 32/198; C01B 32/20; B01D 69/12; B01D 69/10
See application file for complete search history.

(56) References Cited

U.S. PATENT DOCUMENTS

| | | | |
|---|---|---|---|
| 3,457,171 A | 7/1969 | Flowers et al. | |
| 8,361,321 B2 | 1/2013 | Stetson et al. | |
| 8,871,296 B2 | 10/2014 | Zhamu et al. | |
| 9,017,474 B2 | 4/2015 | Geim et al. | |
| 9,095,823 B2 | 8/2015 | Fleming | |
| 9,318,591 B2 | 4/2016 | Geim et al. | |
| 9,548,364 B2 | 1/2017 | Geim et al. | |
| 9,844,758 B2 | 12/2017 | Nair et al. | |
| 10,201,784 B2 | 2/2019 | Stoltenberg et al. | |
| 10,345,490 B2 | 7/2019 | Geim et al. | |
| 10,651,490 B2 | 5/2020 | Lozada et al. | |
| 2013/0011304 A1* | 1/2013 | Schumann | ............ C04B 35/478 422/168 |

(Continued)

FOREIGN PATENT DOCUMENTS

| | | |
|---|---|---|
| KR | 20180000781 A | 1/2018 |
| WO | 2014152407 A1 | 9/2014 |

(Continued)

OTHER PUBLICATIONS

Gongping Liu, Wanqin Jin, Nanping Xu; Graphene-based Membranes; Chemical Society Reviews; 2015; 00, 1-10.

(Continued)

*Primary Examiner* — Ryan B Huang
(74) *Attorney, Agent, or Firm* — ABM Intellectual Property Inc.; Adrienne Bieber McNeil

(57) ABSTRACT

A method for making a membrane includes buffing a first set of graphene platelets onto a surface of a porous substrate to force the graphene platelets into the pores of the substrate, to yield a primed substrate. The method further includes applying a fluid to the primed substrate. The method further includes forcing the fluid through the primed substrate while retaining at least a first portion of the graphene platelets of the first set on the substrate within the pores, to yield a graphene membrane comprising the substrate and a graphene layer platelets lodged within the pores of the substrate.

6 Claims, 2 Drawing Sheets

(56) References Cited

U.S. PATENT DOCUMENTS

| | | |
|---|---|---|
| 2013/0270188 A1 | 10/2013 | Karnik et al. |
| 2014/0151288 A1 | 6/2014 | Miller et al. |
| 2015/0258506 A1 | 9/2015 | Mi et al. |
| 2016/0280563 A1 | 9/2016 | Raveendran-Nair et al. |
| 2016/0297693 A1 | 10/2016 | Raveendran-Nair et al. |
| 2016/0310908 A1 | 10/2016 | Yu |
| 2016/0339160 A1 | 11/2016 | Bedworth et al. |
| 2017/0036911 A1 | 2/2017 | Swett et al. |
| 2017/0040082 A1 | 2/2017 | Swett et al. |
| 2017/0174537 A1 | 6/2017 | Zheng et al. |
| 2018/0154316 A1 | 6/2018 | Nair et al. |
| 2019/0070566 A1* | 3/2019 | Kidambi ............... B01D 61/243 |
| 2020/0001245 A1* | 1/2020 | Karnik ................... C08J 5/2275 |
| 2020/0016547 A1 | 1/2020 | Zheng et al. |
| 2020/0061546 A1 | 2/2020 | Raveendran-Nair et al. |
| 2020/0108353 A1 | 4/2020 | Nair et al. |
| 2020/0215496 A1 | 7/2020 | Raveendran-Nair et al. |
| 2020/0324253 A1 | 10/2020 | Loh et al. |
| 2020/0384422 A1* | 12/2020 | Liu ...................... B01D 69/105 |
| 2021/0016232 A1 | 1/2021 | Liu |
| 2021/0086142 A1 | 3/2021 | Liu |

FOREIGN PATENT DOCUMENTS

| | | |
|---|---|---|
| WO | 2018138486 | 9/2018 |
| WO | 2020000086 A1 | 1/2020 |
| WO | 2020152441 A1 | 7/2020 |

OTHER PUBLICATIONS

Study of Ion and Solvent Transport through Graphene Oxide Membranes; Kai Wang; A thesis presented to the University of Waterloo in fulfillment of the thesis requirement for the degree of Master of Science in Chemistry; Waterloo, Ontario, Canada, 2016.

Yi Han, Zhen Xu, Chao Gao; "Ultrathin Graphene Nanofiltration Membrane for WaterPurification"; Advanced Functional Materials; 2013;23,3693-3700.

Zhu et al. "Membranes prepared from graphene-based nanomaterials for sustainable applications: a review", Environ. Sci. Nano., 2017, 4, 2267-2285.

* cited by examiner

GRAPHENE MEMBRANE AND METHOD FOR MAKING GRAPHENE MEMBRANE

FIELD

This document relates to membranes, for example for use in filters and filtration. More specifically, this document relates to graphene membranes, and to methods for making graphene membranes.

SUMMARY

The following summary is intended to introduce the reader to various aspects of the detailed description, but not to define or delimit any invention.

Membranes are disclosed. According to some aspects, a membrane includes a porous substrate having a first surface and a second surface opposite the first face, and having pores extending between the first surface and the second surface. The pores include relatively large pores and relatively small pores. Filler particles are lodged within at least some of the relatively large pores. Graphene platelets fill at least the relatively small pores.

In some examples, the filler particles include graphite particles and/or wollastonite. In some examples, the graphite particles include nano-graphite platelets.

In some examples, the membrane further includes a layer of graphene platelets on the first surface and a second layer of graphene platelets on the second surface.

In some examples, the membrane further includes a second porous substrate affixed to the porous substrate. Additional filler particles can be lodged within at least some pores of the second porous substrate. At least a second set of graphene platelets fill the pores of the second porous substrate.

Methods for making graphene membranes are also disclosed. According to some aspects, a method for making a membrane includes a. buffing a first set of graphene platelets onto a surface of a porous substrate to force the graphene platelets into the pores of the substrate, to yield a primed substrate; b. applying a fluid to the primed substrate; and c. forcing the fluid through the primed substrate while retaining at least a first portion of the graphene platelets within the pores, to yield a graphene membrane comprising the substrate and a graphene platelets filling the pores of the substrate.

In some examples, step a. is carried out in dry conditions.

In some examples, the first set of graphene platelets is in the form of a powder, and step a. includes rubbing the powder onto the porous substrate.

In some examples, the fluid contains a second set of graphene platelets in suspension, and step c. includes retaining at least a first portion of the graphene platelets of the second set within the pores of the substrate.

In some examples, step c. yields a secondary suspension. The secondary suspension includes the fluid and a second portion of the graphene platelets of the first set and a second portion of the graphene platelets of the second set. The method can further include d. recirculating the secondary suspension through the graphene membrane to yield a built-up membrane.

In some examples, the method further includes serially repeating step d.

In some examples, step d. includes applying the secondary suspension to the graphene membrane and forcing the fluid through the graphene membrane while retaining at least a third portion of the graphene platelets of the first set and at least a third portion of the graphene platelets of the second set within the pores of the substrate, to yield the built-up graphene membrane.

In some examples, step c. includes forcing the suspension through the primed substrate in a first direction, and step d. includes forcing the secondary suspension through the graphene membrane in a second direction opposite the first direction.

In some examples, the first set of graphene platelets is buffed onto a first surface of the porous substrate, and the porous substrate has a second surface opposite the first surface. The method can further include fabricating a second membrane, and affixing the second membrane to the second surface.

In some examples, the suspension further includes filler particles, and during step c. the filler particles block at least some of the pores of the substrate.

Additional methods for making membranes are also disclosed. According to some aspects, a method for making a membrane includes a. applying a suspension to a porous substrate, wherein the suspension comprises graphene platelets in a fluid; b. forcing the fluid through the substrate while retaining a first portion of the graphene platelets within the pores of the porous substrate, to yield a graphene membrane comprising the substrate and graphene platelets filling the pores of the substrate, and a secondary suspension comprising a second portion of the graphene platelets in the fluid; and c. applying the secondary suspension to the graphene membrane, and forcing the fluid through the graphene membrane while retaining a third portion of the graphene platelets within the pores of the porous substrate, to yield a built-up graphene membrane.

In some examples, step c. further yields a tertiary suspension comprising a fourth portion of the graphene platelets in the fluid, and the method further includes applying the tertiary suspension to the built-up membrane, and forcing the fluid through the built-up membrane while retaining a fifth portion of the graphene platelets within the pores of the porous substrate, to yield a further built-up graphene membrane.

In some examples, step a. includes applying the suspension to a first surface of the porous substrate, step b. includes forcing the suspension through the porous substrate in a first direction, and step c. includes applying the secondary suspension to a second surface of the porous substrate and forcing the fluid through the graphene membrane in a second direction opposite the first direction.

In some examples, step a. includes applying the suspension to a first surface of the porous substrate, and the substrate has a second surface opposite the first surface. The method can further include fabricating a second built-up membrane, and affixing the second built-up membrane to the second surface.

In some examples, the suspension further includes filler particles, and during step c. the filler particles block at least some of the pores of the substrate.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Disclosed herein are membranes that include or are made of graphene platelets. For example, the membranes disclosed herein can include a porous substrate with graphene platelets filling the pores of the porous substrate, as well as one or more layers of graphene platelets on the porous substrate. Also disclosed herein are methods for making membranes with graphene platelets. The membranes disclosed herein can be used, for example, in water filtration and purification. Alternatively, the membranes disclosed herein can be used to form conductive surfaces (e.g. for use in batteries), optionally with intercalated ions on or within those surfaces. The membranes disclosed herein can be water permeable, ion impermeable, and conductive of heat and electricity.

As used herein, the term 'platelet' refers to a structure that includes one or multiple (e.g. at least two and up to nine) sheets of graphene. Preferably, platelets include one, two, or three sheets of graphene. A platelet can be, for example, up to 15 nanometers thick, with a diameter of up to 100 microns. As used herein, the term 'graphene platelet' can refer to a platelet of pure graphene (i.e. non-functionalized graphene) and/or a platelet of functionalized graphene. Functionalized graphene can include, for example, hydroxylated graphene (also referred to as graphene oxide), aminated graphene, and/or hydrogenated graphene. Functionalization of the graphene can create pores in the graphene, which can allow for flow of filtrates, and can create a desired spacing between graphene sheets. For example, in platelets of non-functionalized graphene, the interlayer spacing may be approximately 0.34 nm. In platelets of functionalized graphene, e.g. graphene that is functionalized as hydroxylated graphene (also known as graphene oxide), the interlayer spacing may be approximately 0.83 nm.

Figure 1A:
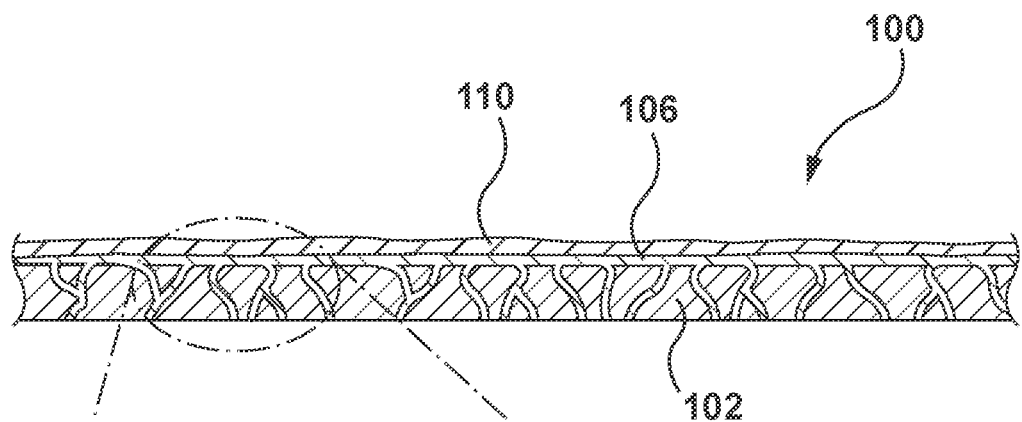
FIG. 1A is a schematic view of an example membrane having graphene platelets filling the pores of a substrate, and two layers of graphene platelets on the surface of the substrate.
Figure 1B:
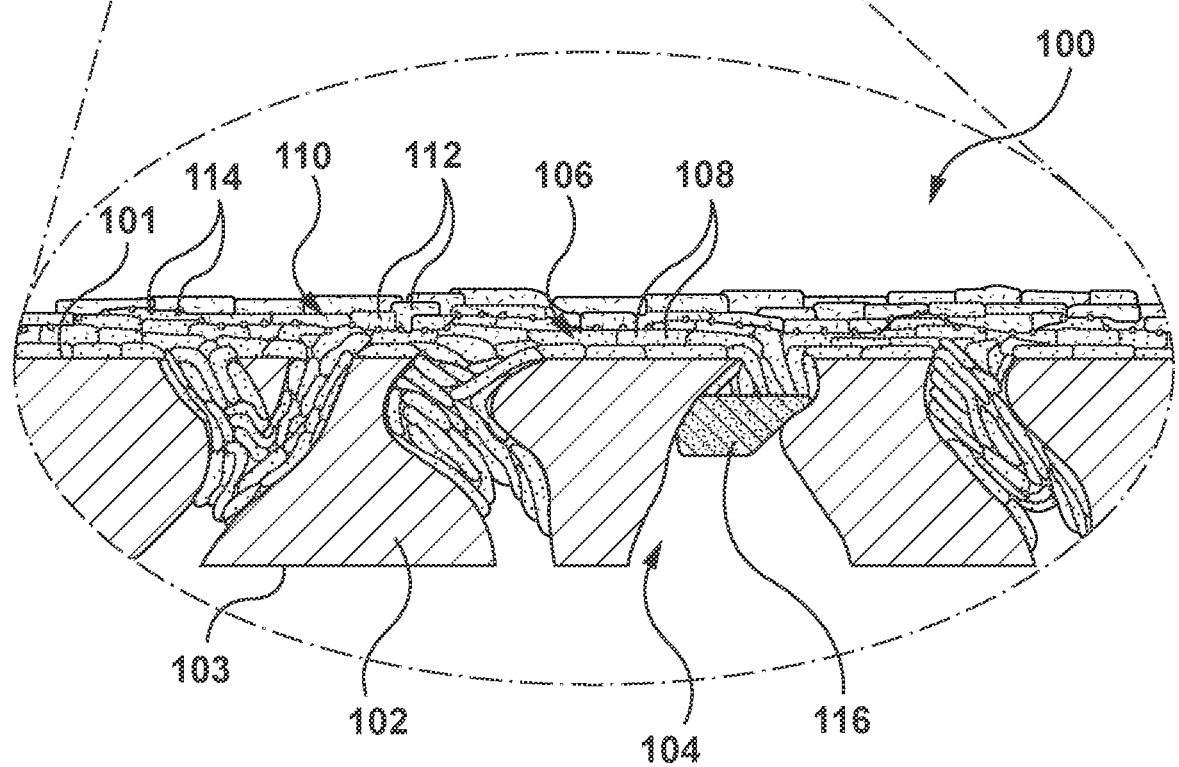
FIG. 1B is an enlarged view of the encircled area in FIG. 1A.

Referring to FIGS. 1A and 1B, a first example of a membrane 100 is shown. The membrane 100 includes a substrate 102, which is porous, and which has a first surface 101 and a second surface 103 opposite the first surface 101. The pores 104 (shown in FIG. 1B, only one of which is labelled) can have a diameter of, for example, less than or equal to 0.03 microns. Preferably, the pores are at most 5 times larger in diameter than the diameter of the graphene platelets. The substrate 102 can have a thickness (i.e. between the first surface 101 and the second surface 103) of, for example, less than 1 mm. In some examples the substrate 102 is a polymer, such as but not limited to polytetrafluoroethylene (Teflon®), polysulfone (PsF) (also referred to as polyether sulfone), cellulose, and/or polyester. In some examples, the substrate 102 is an acid-treated polymer, for example polysulfone treated with sulfuric acid. In some examples, the substrate 102 is an acid-treated and ion-treated polymer, for example polysulfone may be treated with sulfuric acid and then with a solution of metal ions (e.g. aluminum or calcium ions). In examples wherein the polymer is treated with acid and or ions, the polymer, prior to the treatment, may be referred to as a "precursor substrate". Treatment with acid can impart a negative charge to the substrate 102, which can facilitate adhering of the graphene platelets to the substrate 102, as described below.

In one particular example, the substrate 102 can be prepared using a sheet of porous polysulfone, 5 wt % sulfuric acid, a metal ion solution, and deionized water. The polysulfone sheet can be rinsed with the deionized water, and then treated with the sulfuric acid at about 80 degrees Celsius for about 30 minutes. The polysulfone can then be treated with the metal ion solution, for about 2 minutes.

Referring still to FIGS. 1A and 1B, the membrane includes a first type of graphene platelets 108 (only some of which are labelled in FIG. 1B). The graphene platelets 108 of the first type fill the pores substrate (as used herein, the term "fill" is intended to include partial filling and complete filling), and also form a layer 106 of graphene platelets 108 on the first surface 101 of the substrate 102 and supported by the substrate 102. As used herein, the phrase 'supported by the substrate' includes arrangements in which the first layer 106 is directly on the substrate 102 (e.g. on the first surface 101 of the substrate 102), as well as arrangements in which the first layer 106 is spaced from the substrate 102, e.g. by an intermediate layer. In the example shown the first layer 106 of graphene platelets 108 is directly on the substrate.

As used herein the term "layer" refers to an arrangement that includes multiple graphene platelets spread over a supporting structure (e.g. the substrate 102). The platelets in the layer can fully or partially cover the supporting structure. A layer can include an orderly arrangement of platelets, or a disorderly arrangement of platelets. The platelets in a layer can all be parallel to each other, or non-parallel to each other. The term "layer" can refer to an arrangement that is only one platelet deep, or multiple platelets deep (as shown).

In the example shown, the graphene platelets 108 of the first type include aminated graphene. That is, at least some of the platelets 108 include graphene that is functionalized with an amine group. Functionalization of the graphene with an amine group can impart a positive charge to the graphene, which can facilitate adhering of the graphene to the negatively charged substrate 102.

In some examples, aminated graphene can be created by treating hydroxylated graphene with an amine. In one specific example, aminated graphene can be made using commercially available hydroxylated graphene platelets, ethanol, ethylenediamine, 1-(3-dimethylaminopropyl)-3-ethylcarbodiimide methiodide (EDC), and de-ionized (DI) water as starting materials. The hydroxylated graphene platelets may be added to the ethanol (e.g. at 0.02 g/mL) and mixed and sonicated for approximately two hours. The ethylenediamine and EDC may then be added to the suspension of hydroxylated graphene (e.g. each at 0.005 g/mL). The suspension may be stirred at room temperature for about 1 hour, and then the aminated graphene platelets may be filtered and washed with DI water, and dried at 80 degrees Celsius.

Referring still to FIGS. 1A and 1B, in the example shown, the membrane includes a second type of graphene platelets 112 (only some of which are labelled in FIG. 1B), which forms a second layer 110 on the first layer 106 of graphene platelets 108. Optionally, some graphene platelets 112 of the second type can also fill the pores 104 of the substrate 102. In the example shown, the graphene platelets 112 of the second type include hydroxylated graphene. That is, at least some of the platelets 112 include graphene that is functionalized with a hydroxyl group. Functionalization of the graphene with a hydroxyl group can impart a negative charge to the graphene, which can facilitate adhering of the second layer 110 of graphene to the first layer 106 of graphene. The hydroxylated graphene platelets 112 can be commercially available hydroxylated graphene platelets, or can be made from pristine graphene platelets.

In some examples (not shown), instead of hydroxylated graphene, the graphene platelets 112 can include hydrogenated graphene or pristine (i.e. non-functionalized) graphene.

In some examples, the membrane 100 may include ions. The ions can include trivalent ions such as $Al^{3+}$, bivalent ions such as $Ca^{2+}$, or ions of other valencies. The ions can cross-link the platelets, to stabilize the membrane 100. Alternatively, rather than or in addition to being intercalated between platelets within a layer, the ions can be applied as a coating on a given layer of graphene or between two layers of graphene. In the example shown, ions 114 (only some of which are labelled) are between the first layer 106 and second layer 110.

In some examples, in addition to or as an alternative to ions, molecules or other particulates can be deposited on the surface of the membrane 100 or within the graphene layers of the membrane, in order to create cavities in the membrane, adjust the spacing of the platelets or layers, or to create a desired chemical reaction.

In some examples, the membrane 100 may include filler particles 116, which can be lodged in and block at least some pores of the substrate. For example, the filler particles 116 can be used to block relatively large pores that may be too large to retain the graphene platelets (e.g. pores that are 5 to 10 times the diameter of the graphene platelets). The graphene platelets can then fill the relatively small pores of the substrate. The filler particles 116 can be or can include graphite particles, such as nanometer sized graphite particles (also called nano-graphite platelets) or micrometer sized graphite particles. Alternatively or in addition, the filler particles 116 can include wollastonite.

Figure 2:
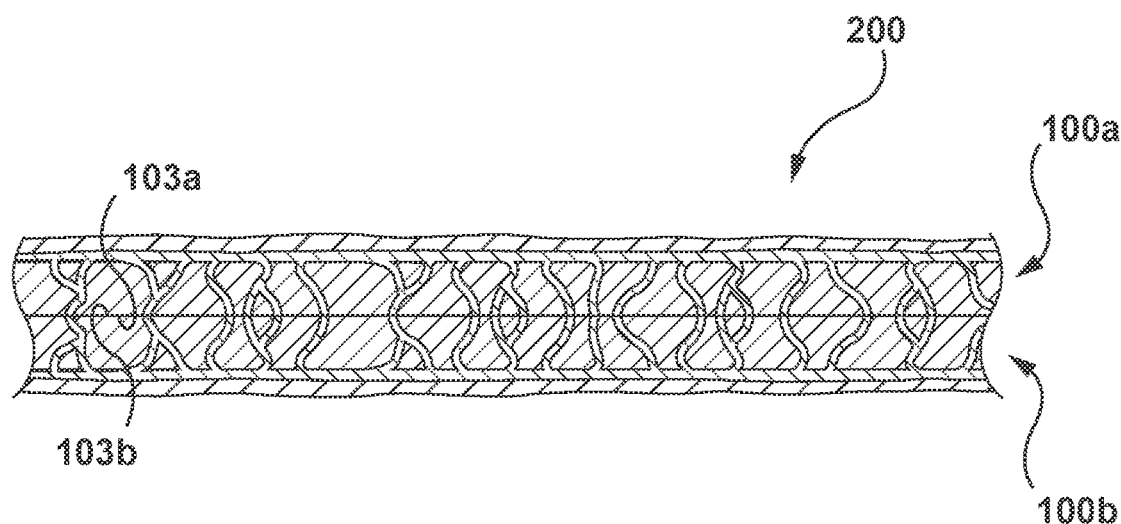
FIG. 2 is a schematic view of a multi-tier membrane made up of two of the membranes of FIG. 1.

In some examples, two or more of the membranes 100 can be affixed together (e.g. sandwiched together in a press) to yield a multi-tier membrane. For example, referring to FIG. 2, a multi-tier membrane 200 is shown, which includes two membranes 100a, 100b. The membranes 100a, 100b are affixed together so that the second surfaces 103a, 103b are facing each other and so that the graphene layers are outwardly facing.

Figure 3:
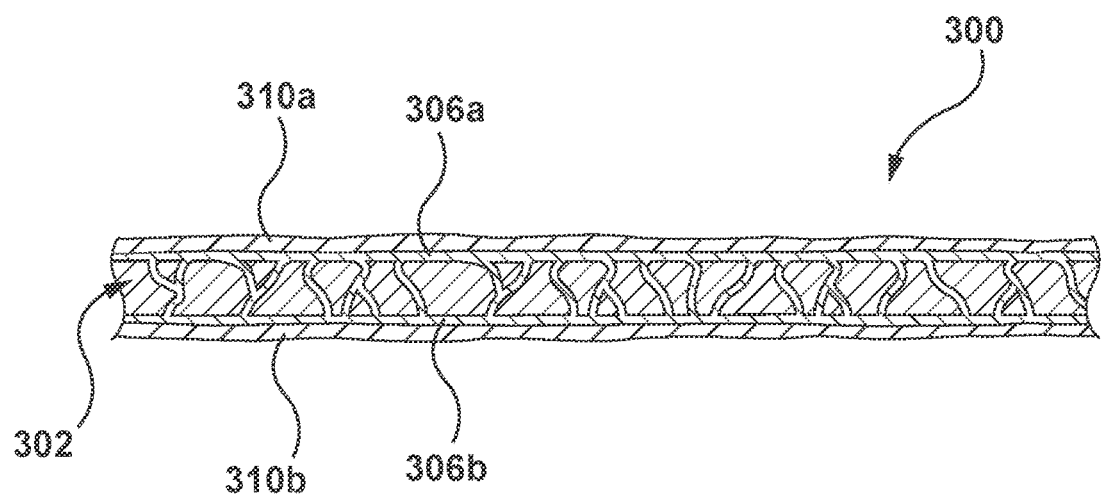
FIG. 3 is a schematic view of a membrane having layers of graphene on both surfaces of a substrate.

In some examples, a membrane can be double-sided, as shown in FIG. 3. In the example of FIG. 3, the membrane 300 includes a substrate 302 with two graphene layers 306a, 310a on its first surface (as described above with regard to FIG. 1), and two graphene layers 306b, 310b on its second surface. The graphene platelets also fill the pores of the substrate. The graphene layers on the second surface can be similar or identical to the graphene layers on the first surface.

In some examples, in order to fabricate the membrane 100, suspensions of the graphene platelets can be applied to the porous polymer substrate 102, so that the graphene platelets are retained within and fill the pores of the substrate, and optionally so that the graphene platelets are retained on the surface of the substrate. The suspending fluid can either filter through the porous substrate 102, leaving graphene platelets behind within the pores and optionally on the substrate 102, or can be drained off the substrate 102 after the graphene platelets settle within the pores and optionally on the substrate. The suspensions can be applied serially, to build up graphene platelets within the pores and optionally on the surface of the substrate 102.

The suspending fluid can be a liquid or a gas. For example, the suspending fluid can be or can include a liquid, such as water, an alcohol, and/or an organic solvent (e.g. N-Methyl-2-pyrrolidone (NMP)). Alternatively, the suspending fluid can be or can include a gas, such as nitrogen gas, water vapor, and/or hydrogen gas.

The suspending fluids can optionally contain dissolved ions, which become entrapped between the graphene platelets as the graphene platelets are deposited and as suspending fluid passes through the substrate 102. The entrapped ions can stabilize and/or cross-link the platelets, create and maintain a desired spacing between the graphene platelets.

The suspending fluids can optionally contain filler particles (e.g. graphite particles, as described above, which can become lodged within the pores).

The suspension can be applied to the substrate 102 in various ways, such as by spraying, painting, or settling. In some examples, a pressure differential is applied to force the suspending fluid through the substrate 102.

Optionally, prior to applying the suspension to the substrate 102, graphene (functionalized or non-functionalized) can be buffed onto the surface of the substrate to force the graphene platelets into the pores of the substrate. That is, graphene platelets (also referred to herein as "a first set of graphene platelets") can be buffed onto the surface of the substrate, in dry conditions, to force the graphene platelets into the pores and spread the graphene platelets over the surface of the substrate. This can be done, for example by using a brush or polishing cloth to apply graphene powder to the substrate. The buffed graphene platelets can be applied to yield, for example, up to 100 mg of buffed graphene per $m^2$ of substrate. For example, the buffed graphene can be applied to yield between 25 mg and 75 mg (inclusive) of buffed graphene per $m^2$ of substrate. After buffing, the substrate can be referred to as a "primed substrate". After buffing, the suspension of graphene (i.e. a suspension of a "second set of graphene platelets" in a fluid) can be applied to the primed substrate. The suspension can wash the first set of graphene platelets further into the pores, while also washing the second set of graphene platelets into the pores and causing the second set of graphene platelets to adhere to the surface of the substrate. This can yield a graphene membrane in which the graphene includes both the first set of graphene platelets (i.e. the buffed graphene) and the second set of graphene platelets (i.e. the graphene of the suspension). In some examples, pristine graphene platelets can first be buffed onto the surface of the substrate, to fill the pores of the substrate. Then, a suspension of aminated graphene platelets can be applied to the primed substrate. This can wash the pristine graphene platelets into the pores and also apply the aminated graphene to the substrate (i.e. to the interior of the pores, as a layer on the pristine graphene that is within the pores, and as a layer on the surface of the substrate). Then, a suspension of hydroxylated graphene can be applied to the membrane. This can further wash the pristine graphene platelets and aminated graphene platelets into the pores and also apply the hydroxylated graphene to the substrate (i.e. to the interior of the pores, as a layer on the aminated graphene and pristine graphene that is within the pores, and as a layer on the surface of the substrate).

Optionally the suspending fluid(s) can be recirculated through the membrane, to build up the membrane (i.e. to yield a "built-up membrane"). For example, in cases where dry buffing of graphene is followed by application of a suspension of graphene, some of the graphene (i.e. a first portion of the graphene platelets of the first set and a first portion of the graphene platelets of the second set) will be retained within the pores of the substrate 102, while some of the graphene (i.e. a second portion of the graphene platelets of the first set and a second portion of the graphene platelets of the second set) will pass through the substrate 102 with the fluid, to yield a secondary suspension. The secondary suspension can then be applied back to the graphene membrane, and the fluid can be forced through the graphene membrane, so that some of the graphene in the suspension (i.e. a third portion of the graphene platelets of the first set and a third portion of the graphene platelets of the second set) is retained within the pores of the graphene membrane. This can be repeated serially—i.e. by recirculating tertiary and further suspensions to deposit fourth and further portions of the graphene on the built-up membrane, to further build up the membrane. This recirculation can also be done in combination with dry buffing (as described above), or without prior dry-buffing.

Optionally, the recirculation can be done to apply graphene to the second surface of the substrate, to yield membrane 300 as shown in FIG. 3. For example, after the first graphene layer has been applied to the first surface of the substrate 302 (i.e. by forcing the suspending fluid through the substrate in a first direction), the secondary suspension can be applied to the second surface of the substrate 302, and the fluid can be forced through the substrate 302 in the opposite direction (i.e. in a second direction that is opposite to the first direction), to fill the pores from the other side.

In one general example, in order to fabricate the membrane 100, the porous polymer substrate 102 is prepared as described above, by treating a precursor polymer substrate with acid and ions, to yield a negatively charged substrate. Graphene powder can then be buffed into the pores of the substrate. Aminated graphene and hydroxylated graphene are also prepared as described above, and are each suspended in a respective suspending fluid. The suspension of aminated graphene platelets 108 can be applied to the substrate 102 and the suspension can be allowed to filter through the substrate 102, to deposit aminated graphene platelets 108 within the pores of the substrate and as a layer on the substrate 102. The suspension of aminated graphene platelets can then be recirculated through the substrate, to build up the membrane. Recirculation can be done, for example, up to 30 times. The suspension of hydroxylated graphene platelets can then be applied to the layer 106 of aminated graphene platelets 108 and the suspension can be allowed to filter through the layer 106 of aminated graphene platelets 108 and the substrate 102, to deposit a layer of hydroxylated graphene platelets 112 on the layer of aminated graphene platelets 108. The suspension of hydroxylated graphene platelets can then be recirculated through the substrate (e.g. up to 30 times), to build up the membrane.

In one specific example, the membrane 100 can be fabricated as follows: The substrate 102 can be prepared by treating a polysulfone sheet with sulfuric acid and ions, as described above. Graphene powder (e.g. approximately 10 wt % of the total amount of graphene in the membrane) can be buffed onto the prepared substrate using a micropore cloth. Aminated graphene can be prepared as described above, and a suspension of the aminated graphene can be prepared by mixing 1 wt % camphor sulfonic acid (CSA), 100 ppm aminated graphene, and 0.2 wt % sodium dodecyl sulfate (SDS), and sonicating for 30 minutes. The suspension of aminated graphene can then be applied to the prepared substrate 102 (20 mL of suspension per $cm^2$ of substrate), and allowed to sit on the prepared substrate 102 (e.g. for one minute), until the suspension filters through the substrate 102. The suspension of aminated graphene can then be recirculated through the membrane repeatedly. The substrate 102 and deposited aminated graphene platelets 108 can be allowed to dry. Next, a suspension of hydroxylated graphene can be prepared by exfoliating the hydroxylated graphene and dispersing it in water (1 mg hydroxylated graphene per mL water). The suspension of hydroxylated graphene can then be applied to the substrate 102 (20 mL suspension per $cm^2$ of prepared substrate), over the aminated graphene platelets 108. The water can be allowed to filter through the aminated graphene platelets 108 and substrate 102 until the membrane is dry. The suspension of hydroxylated graphene can then be recirculated through the membrane repeatedly. The membrane 100 can then be treated with heat, e.g. at 65 degrees Celsius for 5 minutes.

As mentioned above, the membranes disclosed herein can be used, for example, in water filtration and purification. For example, filtrate molecules can pass through pores or perforations in the graphene, as well as between adjacent graphene sheets in the platelets 108, 112, and between adjacent platelets 108,112. Filtrate molecules can then pass through the pores 104 of the substrate 102. Larger ions, molecules, and particles will be retained by the graphene platelets 108, 112, as they will be too large to pass through the pores, between the graphene sheets, and between adjacent platelets 108, 112.

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

EXAMPLES

Example 1

Materials & Methods

One 4.7 cm diameter membrane was produced as a control, as described below. Two 4.7 cm diameter test membranes were produced, as described below.

Control Membrane:

A suspension of 8 ppm of graphene oxide platelets (from the "Graphene Superstore") in di-ionized water was created by sonification with 100 ppm of $AlCl_3$. A 47 mm diameter porous polysulfone (PSF) sheet was used as the substrate. A suspension volume sufficient to contain 62 mg of graphene oxide per $m^2$ was filtered through each substrate using 100 kPa pressure drop (atmospheric to vacuum). The substrates and deposited graphene oxide were then oven dried at 60 C until dry.

Test Membrane:

STEP 1—Amination: 1 g of hydroxylated graphene powder was added to 50 mL of ethanol (0.02 g/mL), mixed for one minute, then sonicated for two hours. 2.5 g of ethylenediamine and 0.25 g of EDC was added to the mixture, and the mixture was stirred at room temperature for one hour. The mixture was filtered and washed with de-ionized (DI) water. The filtrate was dried at 80 degrees Celsius. The resulting aminated graphene was set aside.

STEP 2—Substrate treatment: A precursor substrate (4.7 cm diameter polysulfone polymer sheet, pore size less than 0.03 microns) was placed in a bath of deionized water (tank 1) for five minutes, removing any bubbles with careful agitation. The precursor substrate was removed from tank 1, and place in tank 2, containing an aqueous solution of 5.0 wt % $H_2SO_4$ at 80 degrees C. Bubbles were removed with careful agitation. The substrate was removed from tank 2, and placed in tank 3, containing an aqueous solution of 100 ppm $AlCl_3$, for two minutes. Bubbles were removed with careful agitation.

STEP 3—Manufacture of Membrane: A suspension of hydroxylated graphene in water (1 mg/ml) was exfoliated and dispersed using ultrasound. The suspension was filtered through the substrate (from STEP 2) until dry using a dead-end vacuum filter system (20 mL/$cm^2$ of hydroxylated graphene suspension per substrate area) to create a membrane of the substrate and hydroxylated graphene platelets. A solution/suspension mix of 1 wt % CSA, 100 ppm aminated-graphene (from STEP 1), and 0.2 wt % SDS was created and sonicated for 30 minutes. 20 mL/$cm^2$ of this solution/suspension was allowed to sit on the top surface of the membrane and hydroxylated graphene platelets for one minute. The solution/suspension was then drained from the substrate, and the resulting membrane was treated with heat at 65 degrees C. for 5 minutes.

Test Procedures:

Filtration Test: 5400 ppm of NaCl was added to 2L of deionized water. Salinity was checked using a TDS electrode meter (HACH). The membranes were mounted in a 4.7 cm vacuum filter. 50 mL of the NaCl solution was added to the membranes, and a vacuum was applied for one hour collecting the filtrate. Salinity of the filtrate was checked using a TDS electrode meter (HACH).

Durability Test: The membrane was mounted on a plate. A gasket with an inner diameter of 4.5 cm and outer diameter of 5.0 cm was positioned on-top of the membrane. This assembly was then bolted to an additional flat plate with a central hole of 4.5 cm diameter. Attached to the upper plate were a fluid input port and distribution baffles to ensure even flow across the sample surface. A water flow of 0.5 L/min was applied across the surface for a period of eight hours.

Results

The results of the durability tests are summarized in Table 1 (flow rates) and Table 2 (efficiency). Table 3 and Table 4 contain the raw data from the tests.

TABLE 1

Flowrates in L/hr/$m^2$ of membrane surface area based 10 tests for control, and 20 tests for the test membrane

| Test | Base-Line | | | 8 hr | | | Average Change |
|---|---|---|---|---|---|---|---|
| | Min | Ave | Max | Min | Ave | Max | |
| Control | 6.0 | 6.8 | 9.2 | 34.9 | 191 | 789 | 184 |
| Test Membrane | 4.4 | 7.4 | 9.9 | 4.6 | 7.5 | 9.5 | −0.1 |

TABLE 2

Efficiency of separation as filtrate concentration divided by source concentration

| Test | Base-Line | | | 8 hr | | | Average Change |
|---|---|---|---|---|---|---|---|
| | Min | Ave | Max | Min | Ave | Maxi | |
| Control | 90.8% | 91.6% | 92.8% | 1.9% | 3.9% | 6.3% | 86.3% |
| Test Membrane | 94.4% | 95.5% | 96.3% | 94.4% | 95.5% | 96.3% | 0% |

TABLE 3

Full results of tests on Control Membrane. 5400 ppm NaCl filtered at 700 kPa. Flow in mL/min.

| | Baseline | | After Durability | |
|---|---|---|---|---|
| | Flow rate | conc/TDS | Flow rate | conc/tds |
| 1 | 0.21 | 92.78 | 1.25 | 5.56 |
| 2 | 0.21 | 92.59 | 1.20 | 5.56 |
| 3 | 0.27 | 92.48 | 1.57 | 3.89 |
| 4 | 0.20 | 91.48 | 1.20 | 3.70 |
| 5 | 0.18 | 91.67 | 1.15 | 3.89 |
| 6 | 0.18 | 91.48 | 1.15 | 4.07 |
| 7 | 0.18 | 90.98 | 1.18 | 1.85 |
| 8 | 0.17 | 90.81 | 1.14 | 6.30 |
| 9 | 0.18 | 90.93 | 22.80 | 1.85 |
| 10 | 0.19 | 90.91 | 22.60 | 1.85 |

TABLE 4

Full results of tests on Test Membranes. 5400 ppm NaCl filtered at 700 kPa. Flow in mL/min

| | Baseline | | After Durability | |
|---|---|---|---|---|
| | Flow rate | conc/TDS | Flow rate | conc/tds |
| 1 | 0.27 | 94.44 | 0.27 | 94.63 |
| 2 | 0.29 | 94.81 | 0.27 | 94.81 |
| 3 | 0.23 | 95.19 | 0.22 | 95.09 |
| 4 | 0.22 | 95.19 | 0.21 | 95.22 |
| 5 | 0.20 | 95.46 | 0.19 | 95.52 |
| 6 | 0.20 | 95.74 | 0.19 | 95.70 |

TABLE 4-continued

Full results of tests on Test Membranes. 5400
ppm NaCl filtered at 700 kPa. Flow in mL/min

|   | Baseline | | After Durability | |
|---|---|---|---|---|
|   | Flow rate | conc/TDS | Flow rate | conc/tds |
| 7 | 0.21 | 96.17 | 0.22 | 96.28 |
| 8 | 0.20 | 96.19 | 0.22 | 96.15 |
| 9 | 0.20 | 95.74 | 0.20 | 95.76 |
| 10 | 0.13 | 96.11 | 0.13 | 96.15 |
| 11 | 0.21 | 94.63 | 0.22 | 94.44 |
| 12 | 0.28 | 94.44 | 0.26 | 95.00 |
| 13 | 0.22 | 95.37 | 0.23 | 94.91 |
| 14 | 0.20 | 95.37 | 0.23 | 95.19 |
| 15 | 0.21 | 95.46 | 0.20 | 95.46 |
| 16 | 0.21 | 95.74 | 0.20 | 95.74 |
| 17 | 0.19 | 96.11 | 0.23 | 96.11 |
| 18 | 0.21 | 96.20 | 0.22 | 96.07 |
| 19 | 0.20 | 95.93 | 0.22 | 95.57 |
| 20 | 0.20 | 96.30 | 0.21 | 95.96 |

Control membranes averaged a 91.6 efficiency with a flow rate of 6.8 L/hr/m2 of membrane under the test conditions. This may be suitable for most applications when two membranes are used in series. However, under cross-flow conditions approximating those found in reverse osmosis filters, the flow rate increased to over 100 L/hr/m2 and the efficiency dropped to less then 7%. These changes indicate a failure of the membrane.

Test membranes, i.e. those including hydroxylated and aminated graphene layers, averaged a better efficiency, at 95.5% for a 3.6% improvement at flow rates of 7.4 L/hr/m$^2$, or an improvement of 0.6 L/hr/m$^2$ over the control membranes. After the 8 hr cross-flow test, the average flow across the modified membranes remained essentially unchanged (slight decrease was not statistically significant, and the efficiencies had no noticeable changes).

Example 2

Buffing of dry graphene onto a substrate was assessed as follows.

Materials & Methods

A 43 cm×43 cm porous polysulfone sheet was used as the substrate.

Graphene platelets were buffed onto the substrate in dry conditions, as follows: Approximately 10 wt % of the graphene was placed on a micropore cloth. The graphene was gently buffed onto the surface of the substrate to spread the graphene to approximately 10% of the total area of the substrate. This was repeated for the remaining areas of the substrate. The entire surface was then re-buffed, resulting in a greyish coating.

The substrate, with the buffed graphene, was then mounted in a press. 4 L of water was added. The pressure was increased (See Table 5) and the flow was measured.

Results

At 75 mg/m$^2$, the graphene appeared as a smooth metallic grey coating on the surface of the substrate, and coverage of the substrate was inspected and confirmed visually. At 75 mg/m$^2$, approximately a 90% reduction in flow of water was achieved.

At 25 mg/m$^2$, the graphene appeared light grey on the surface of the substrate, and coverage of the substrate was inspected and confirmed visually. At 75 mg/m$^2$, approximately a 90% reduction in flow of water was also achieved.

TABLE 5

|   | Flow (L/min/m$^2$) | | |
|---|---|---|---|
| Pressure (kPa) | 0 mg/m$^2$ Dry Graphene | 25 mg/m$^2$ Dry Graphene | 75 mg/m$^2$ Dry Graphene |
| 650 | 1.00 | 0.11 | 0.08 |
| 850 | 1.31 | 0.13 | 0.15 |
| 1300 | 1.38 | n/a | n/a |
| 1450 | 1.56 | n/a | n/a |
| 1550 | 1.88 | 0.17 | 0.19 |
| 2000 | n/a | n/a | 0.20 |

It is believed that lesser amounts of graphene will also result in a high reduction of flow of water.

Example 3

The use of filler particles was assessed as follows.

Materials and Methods

A porous polyester mat, with pore sizes ranging up to approximately 400 microns, was mounted in a press. A heavy filter cloth was mounted in the press to support the mat. A suspension containing 10 g of graphite, with particles ranging from 20 to 200 microns in diameter, was filtered and recirculated through the substrate. A suspension of graphene oxide (200 mg/m$^2$) was then filtered through the graphite impregnated substrate.

Results

There was essentially no resistance to water flow through the initial substrate, prior to impregnation with graphite. All of the suspended graphite was removed from the suspension after four passes through the substrate.

The membrane yielded flow rates of 0.2 L/min/m$^2$ at a pressure of less than 400 kPa.

I claim:

1. A membrane comprising:
  a. a porous substrate having a first surface and a second surface opposite the first surface, and having pores extending between the first surface and the second surface, wherein the pores include relatively large pores and relatively s mall pores;
  b. graphene platelets filling at least the relatively small pores; and
  c. filler particles lodged within at least some of the relatively large pores to block the relatively large pores, wherein the filler particles are not graphene platelets, and wherein the relatively large pores are 5 to 10 times the diameter of the graphene platelets.

2. The membrane of claim 1, wherein the filler particles comprise wollastonite.

3. The membrane of claim 1, wherein the filler particles comprise graphite particles.

4. The membrane of claim 3, wherein the graphite particles comprise nano-meter sized graphite particles.

5. The membrane of claim 1, wherein the membrane further comprises a layer of graphene platelets on the first surface and a second layer of graphene platelets on the second surface.

6. The membrane of claim 1, further comprising a second porous substrate affixed to the porous substrate, additional filler particles lodged within at least some pores of the second porous substrate, and at least a second set of graphene platelets filling at least some pores of the second porous substrate.

* * * * *